United States Patent
Joffe

[11] Patent Number: 5,936,959
[45] Date of Patent: Aug. 10, 1999

[54] CELL ROUTING IN ATM NETWORKS

[75] Inventor: Alex Joffe, Palo Alto, Calif.

[73] Assignee: MMC Networks, Inc., Santa Clara, Calif.

[21] Appl. No.: 08/657,835

[22] Filed: May 31, 1996

[51] Int. Cl.[6] .................................................. H04L 12/56
[52] U.S. Cl. ............................................. 370/397; 370/399
[58] Field of Search ..................................... 370/252, 389, 370/395, 396, 397, 398, 399, 400, 409, 242, 244, 250

[56] References Cited

U.S. PATENT DOCUMENTS

| | | | |
|---|---|---|---|
| 5,323,389 | 6/1994 | Bitz et al. .................................. | 370/397 |
| 5,414,701 | 5/1995 | Ronen Shtayer ........................ | 370/395 |
| 5,479,401 | 12/1995 | Bitz et al. .................................. | 370/397 |
| 5,488,606 | 1/1996 | Kakuma et al. .......................... | 370/397 |
| 5,506,840 | 4/1996 | Pauwels et al. .......................... | 370/397 |
| 5,530,806 | 6/1996 | Condon et al. ............................ | 370/397 |
| 5,636,206 | 6/1997 | Amemiya et al. ........................ | 370/244 |
| 5,638,364 | 6/1997 | Sugita ........................................ | 370/397 |
| 5,757,796 | 5/1998 | Hebb ........................................ | 370/397 |

OTHER PUBLICATIONS

Kyas, Othmar, "ATM networks" (Int'l Thomson Publishing, London 1995).

*Primary Examiner*—Chi H. Pham
*Assistant Examiner*—Ricky Q. Ngo
*Attorney, Agent, or Firm*—Skjerven, Morrill, MacPherson, Franklin, & Friel LLP; Michael Shenker; Glen B. Choi

[57] ABSTRACT

In an ATM switch, an input port number, an input VPI and an input VCI are used to generate a header appended to the cell when the cell is transmitted. The input port number and the input VPI are combined to form a pointer to a look-up table (LUT). The LUT entry contains a first portion of a pointer to an Input Translation Table (ITT). An ITT entry provides sufficient information to generate the header. The LUT entry contains also some or all of the bits of a mask to be applied to the input VCI to obtain a second portion of the pointer to the ITT. The number of the mask bits is variable. All the mask bits are 1. The mask bits are separated from the first portion of the ITT pointer by a 0 bit.

55 Claims, 8 Drawing Sheets

CELL ROUTING IN ATM NETWORKS

BACKGROUND OF THE INVENTION

The present invention relates to electronic devices, and more particularly to two-way translation performed by electronic devices and to cell routing in ATM (Asynchronous Transfer Mode) networks.

A cell in an ATM network has a header that includes a Virtual Path Identifier (VPI) and a Virtual Circuit Identifier (VCI). See O. Kyas, "ATM Networks" (1995). An ATM switch determines the VPI and/or the VCI of the incoming cell, inserts new VPI and/or VCI values into the cell's header, and retransmits the cell.

It is desirable to provide fast and simple apparatus and methods for determining the new VPI and VCI.

SUMMARY

The present invention provides in some embodiments fast and simple apparatus and methods for determining the new VPI and VCI.

In some embodiments, two-way translation is used to translate the input VPI and VCI to the new VPI and VCI. More particularly, the input VPI and the input port number are combined to form a pointer to a look-up table (LUT). The entry in the LUT includes information which is combined with the input VCI to get a second pointer. The second pointer points to another table (Input Translation Table or ITT), which stores information allowing to obtain the new VPI and VCI.

In the ITT, entries corresponding to the same input VPI and the same input port number but to different input VCI's are stored as a block of entries adjacent to one another. If due to an error an input VCI is too large, the pointer to the ITT could point to an entry designed for a different combination of an input VPI and an input port number. To prevent the traffic from being affected by such errors, the switch should check that the VCI used to construct a pointer to the ITT is within a certain high bound.

The high bound can be stored in the LUT. Storing the high bound should be efficient not to waste the LUT space. If, for example, a predetermined number of bits are allocated for the high bound in every LUT entry, bits can be wasted if the high bound is small and needs fewer bits than are allocated. Therefore, in some embodiments of the invention, a variable number of bits are allocated for the high bound in the LUT entry. Moreover, to further reduce the number of bits allocated, the LUT entry does not store the high bound but rather stores bits of a VCI mask. The VCI mask is applied to the input VCI to test whether the VCI exceeds the high bound.

More particularly, in some embodiments, a LUT entry includes a string of zero or more 1's, followed by a 0 delimiter bit, which is followed by the most significant bits of the ITT pointer. This string of 1's is a mask field. In some embodiments, the mask field is augmented by two 1's, or by some other number of 1's. The mask is inverted and then ANDed with the input VCI. If the result of the AND operation is not zero, the input VCI is too large, and the cell is discarded. The inverter and the AND circuit that perform bound checking operations described above are fast and simple.

The ITT pointer is generated by means of ORing the input VCI with the most significant bits provided by the LUT entry. The OR circuit that generates the ITT pointer is also fast and simple.

Other features and advantages of the invention are described below. The invention is defined by the appended claims.

DESCRIPTION OF PREFERRED EMBODIMENTS

Embodiments described below are illustrative and do not limit the invention. The invention is defined by the appended claims.

Figure 1:
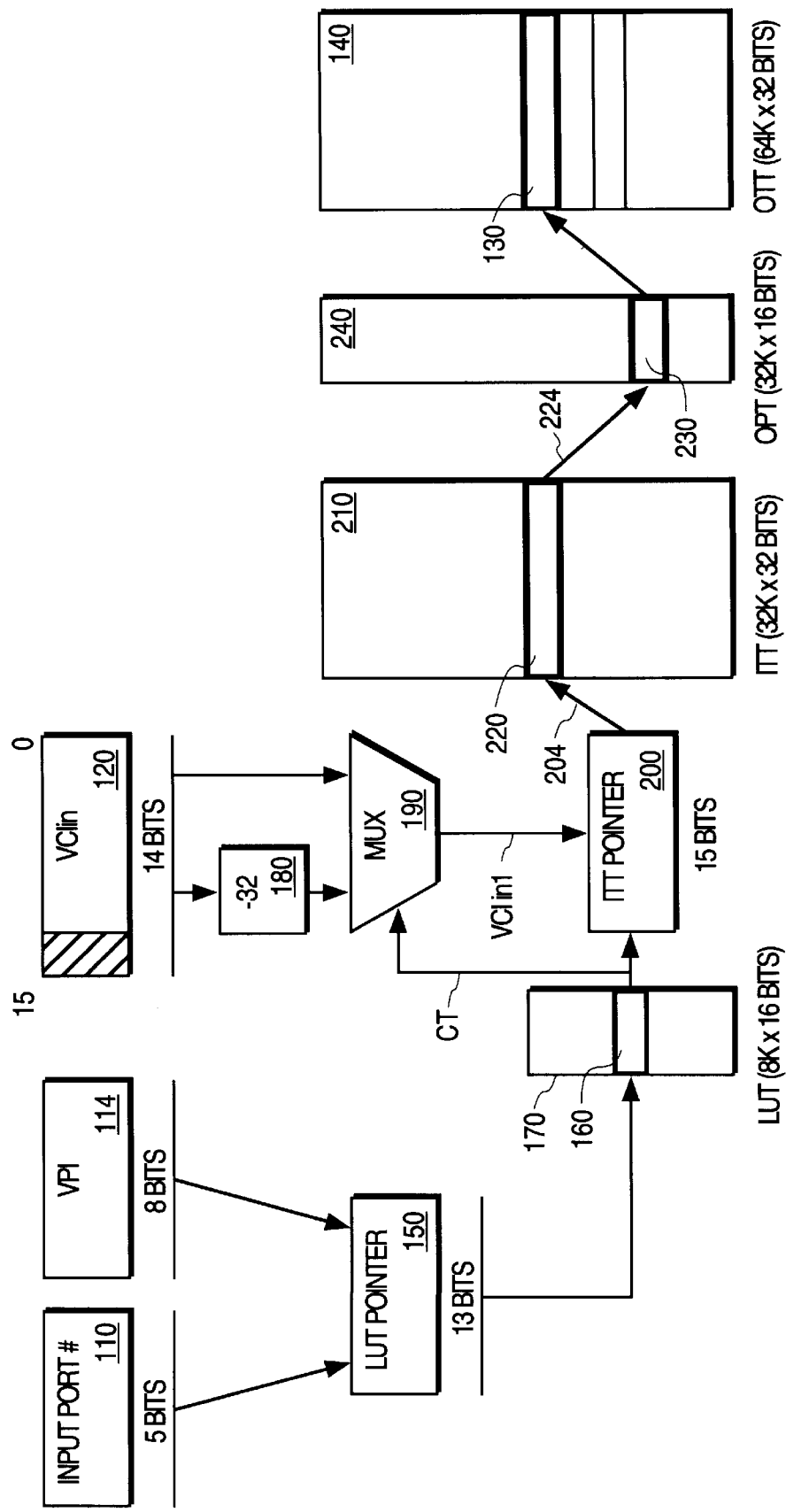
FIG. 1 is a block diagram illustrating data structures and circuitry for translating an input VPI, an input VCI and an input port number to an output VPI and an output VCI according to the present invention.

FIG. 1 illustrates address translation performed by an ATM switch to route an ATM cell. The switch has 32 ports (not shown) each of which is identified by a port number 110. A cell received on such a port includes a header that includes a Virtual Path Identifier (VPI) 114 and a Virtual Channel Identifier (VCI) 120. VCI 120 is also shown as VCIin in FIG. 1. Using the cell's input port number 110, VPI 114 and VCI 120, the switch locates an entry 130 in Output Translation Table (OTT) 140. Entry 130 specifies an output port on which the cell is to be transmitted. Entry 130 also specifies the VPI and VCI to be inserted into the cell's header transmitted with the cell.

In the embodiment of FIG. 1, input port number 110 occupies 5 bits, and VPI 114 occupies 8 bits. VCI 120 occupies 16 bits. However, the VCI values are sufficiently small to fit into 14 bits. (The VCI values in the incoming cells are set by the switch itself and are transmitted to upstream switches for insertion into the cell's headers). Therefore, the most significant bits [15:14] of VCIin are 0.

As shown in FIG. 1, the switch concatenates input port number 110 and input VPI 114 to obtain 13-bit LUT pointer 150. Pointer 150 identifies an entry 160 in look-up table (LUT) 170. LUT 170 is stored in the switch memory.

Subtractor 180 subtracts 32 from VCIin[13:0] and generates the signal VCIin−32. Multiplexer 190 selects VCIin [13:0] or bits [13:0] of VCIin−32 under the control of a CT field in LUT entry 160. The CT field is described below. The 14-bit output VCIin1 of multiplexer 190 is delivered to circuit 200. Circuit 200 receives also information from LUT entry 160 and generates a 15-bit ITT pointer 204. Pointer 204 points to an entry 220 in Input Translation Table (ITT) 210. ITT 210 is stored in the switch memory.

ITT entry 220 includes a pointer ("OPT pointer") 224 to an entry 230 in Output Pointer Table (OPT) 240. Entry 230 is a pointer to OTT entry 130.

Before the subtractor 180 subtracts 32, a circuit (not shown) determines if VCIin[13:5]=0. If VCIin[13:5] is zero, then VCIin≦31. In this case, if the CT signal selects VCIin−32 (that is, if the CT signal value is "01" as described below), the cell is not transmitted to the network.

In the embodiment of FIG. 1, LUT 170 has a capacity to hold 8K entries of 16 bits each; ITT 210 has a capacity to hold 32K entries of 32 bits each; OPT 240 has a capacity to hold 32K entries of 16 bits each; OTT 140 has a capacity to hold 64K entries of 32 bits each. Other capacities and entry lengths are used in other embodiments.

In some embodiments, OPT 240 is omitted; ITT entry 220 includes a pointer to entry 130. In some embodiments, ITT 210 and OPT 240 are omitted; pointer 204 points directly to entry 130.

Figure 2:
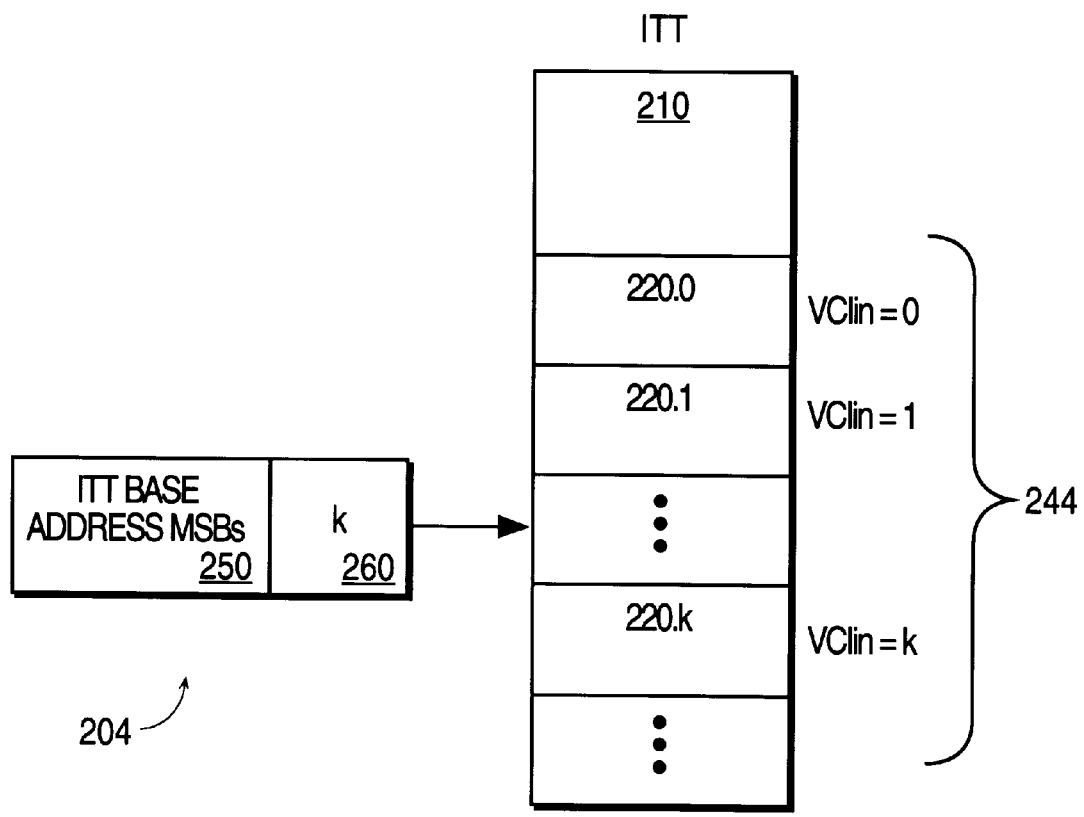
FIG. 2 diagrams an Input Translation Table (ITT) and a pointer to the ITT for the system of FIG. 1.

FIG. 2 illustrates a block 244 of ITT entries 220 corresponding to the same input port number 110 and the same VPI 114, and hence to the same LUT entry 160. Different entries correspond to different VCIin values 120. Pointer 204 points to an entry 220.k corresponding to VCIin=k. Pointer 204 includes a field 250 determined by LUT entry 160. This field is called "ITT base address MSBs". Pointer 204 includes also a field 260 obtained from VCIin 120. Field 250 includes the most significant bits (MSBs) of pointer 204. Field 260 includes the least significant bits.

In order not to waste space in 15-bit pointers 204 and in LUT entries storing the pointers' MSBs, the fields 250, 260 have variable sizes determined by entry 160. See FIG. 3. 16-bit entry 160 includes a 2-bit field CT described above in connection with FIG. 1. Entry 160 includes also ITT base address MSBs 250 in bits [13:n+1] where n is a number in the range from 0 to 12 inclusive. Bits [n−1:0], shown at 310, are all 1's. These bits, together with two implied 1's shown at 320, form a VCI mask used to check if VCIin is too large. If VCIin is too large, the cell is discarded. Bits 310 are also used to define the size of field 250 and, therefore, of field 260. If n=0, field 310 is empty, and the VCI mask includes only two 1's, which are the implied 1's 320. Field 320 is not stored in the switch.

Bit [n] is 0. This bit is a delimiter marking the start of mask field 310.

ITT pointer generation circuit 200 (FIG. 1) reads entry 160 and shifts the read out entry right until the delimiter bit 0 is shifted out. At this point, the number "n" is known to circuit 200. Circuit 200 shifts the ITT base address MSBs 250 back by n+2 bits, into the most significant bits of 15-bit signal 330. The n+2 LSBs of signal 330 are 0.

Circuit 200 appends the two implied 1's to field 310 and places the resulting string of 1's into the LSBs of 16-bit mask 340. The remaining bits of mask 340 are 0.

Inverter 344 inverts the mask. AND circuit 350 performs a bitwise AND operation ANDing the bits of the inverted mask and the respective bits of signal VCIin2. Signal VCIin2 is obtained from VCIin1 by appending VCIin [15:14] at the most significant bit positions. Circuit 354 compares the output of AND circuit 350 with zero. If the output is zero, VCIin is greater than the high bound defined by mask field 310. This is an error condition. The cell is discarded.

In parallel with circuits 344, 350, and 354, OR circuit 370 bitwise-ORs 14 LSBs of signal 330 with VCIin1. The output of circuit 370 is 14 LSBs of ITT pointer 204. The MSB of signal 330 is the MSB of 15-bit pointer 204.

Circuits 344, 350, 354 and 370 are part of circuit 200.

Field CT (connection type) in LUT entry 160 has the following meaning:

"00" means an invalid entry.

"01" means Virtual Circuit Connection with VCIin1= VCIin−32. This CT value can be used to save addressing space where the VCI values from 0 to 31 are reserved for special functions. In such connections, cells with VCIin values from 0 to 31 are not transmitted to the network.

"10" means Virtual Circuit Connection with VCIin1= VCIin.

Figure 4:
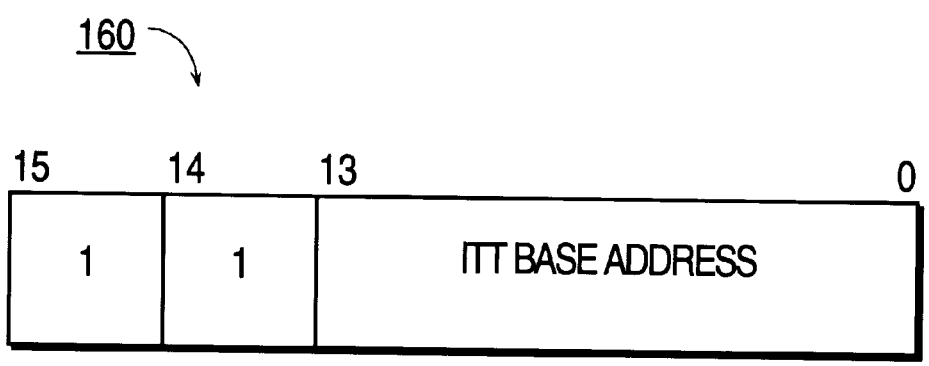
FIG. 4 diagrams a table entry for the system of FIG. 1.

"11" means Virtual Path Connection. In this case, the remaining 14 bits of LUT entry 160 provide the ITT base address as shown in FIG. 4. This address is the value of pointer 204; field 260 (FIG. 2) is empty. Due to the size of pointer 204, ITT entries for VP connections reside in the lower 16K entry positions of ITT 210.

Figure 3:
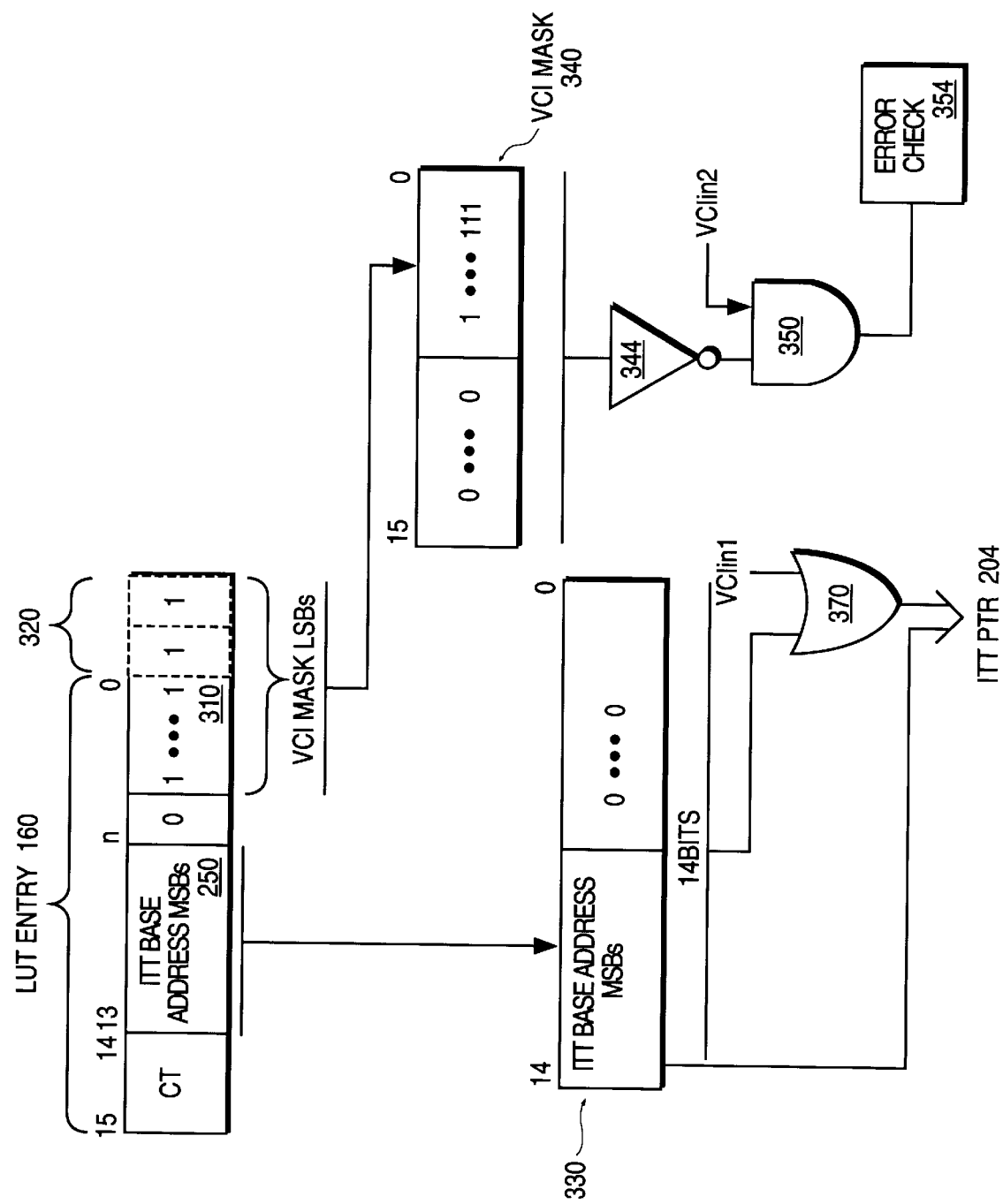
FIG. 3 is a detailed diagram of some data structures and circuitry of FIG. 1.

As is clear from FIG. 3, for VC connections the mask field 310 defines a high bound for VCIin1. This high bound is $2^{n+2}-1$. Mask field 310 also defines a high bound for VCIin 120. This high bound is $2^{n+2}-1$ or $2^{n+2}+31$, depending on the CT value. The high bound is stored in n+1 bits (including the delimiter bit). Therefore, the smaller the high bound value, the fewer bits are used to define the high bound. Hence, memory is not wasted to store small high bounds.

As is clear from FIG. 2, block 244 of ITT entries corresponding to a given VPI and a given input port number starts on a $2^{n+2}$ entry boundary. If VCIin1 exceeds its high bound, the cell is discarded as described above. The switch is therefore made safer against errors. At the same time, generating the pointer 204 is fast and simple.

In some embodiments, input port number 110 is not used to form LUT pointer 150.

Figure 5:
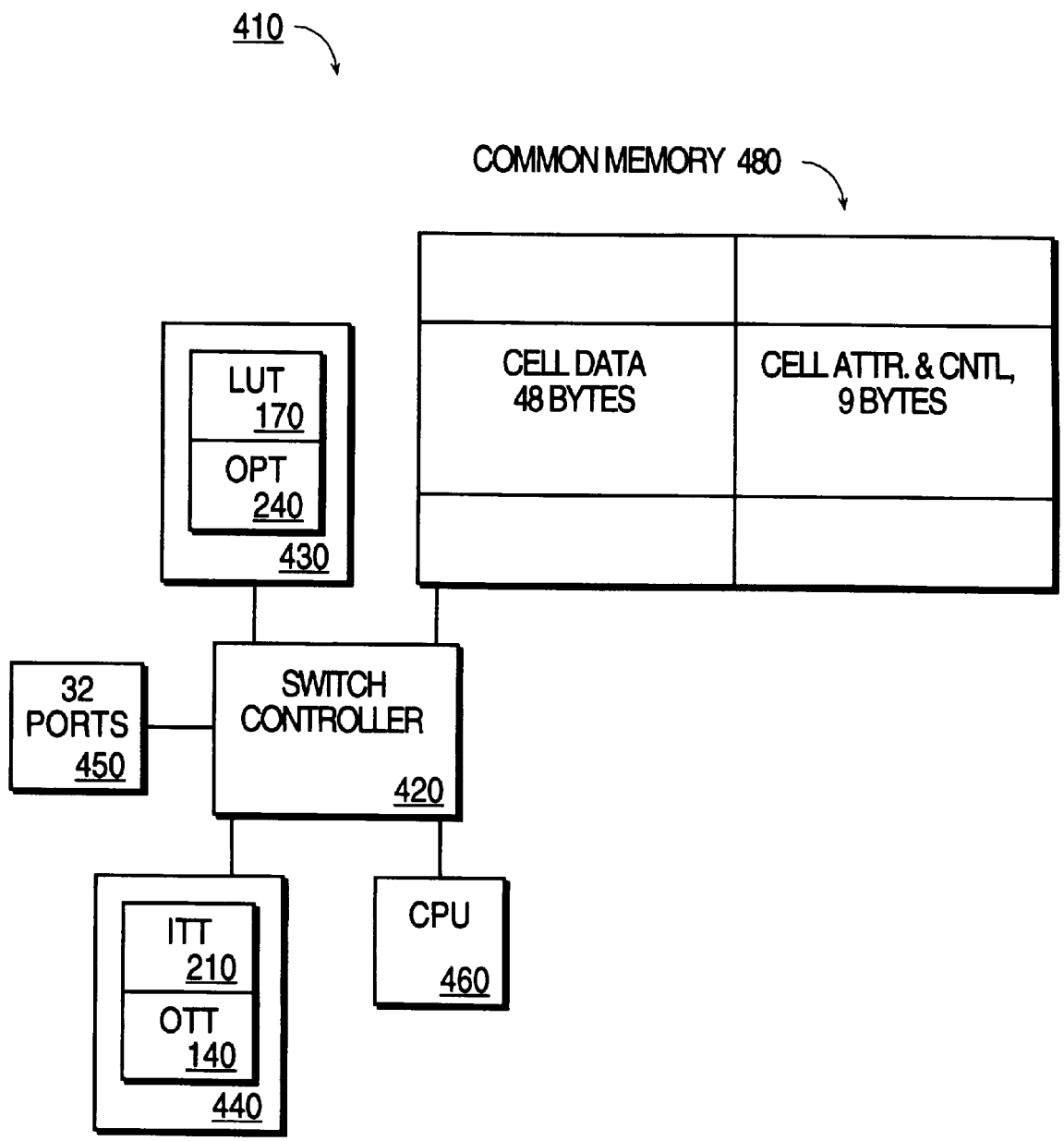
FIG. 5 is a block diagram of an ATM switch according to the present invention.

FIG. 5 is a block diagram of a switch 410 operating in accordance with FIGS. 1–3. Switch controller 420 performs the address translation illustrated in FIGS. 1 and 3. ITT pointer generation circuit 200 (FIG. 1) is part of controller 420. 16-bit wide memory 430 connected to controller 420 stores LUT 170 and OPT 240. The same address, data and memory control lines are used to access LUT 170 and OPT 240. 32-bit wide memory 440 connected to controller 420 stores ITT 210 and OTT 140. The same address, data and memory control lines are used to access ITT 210 and OTT 140.

Controller 420 is connected to 32 full-duplex ports 450, each of which is identified by a 5-bit number such as number 110 (FIG. 1). CPU 460 connected to controller 420 is responsible for initialization, connection setup and statistics gathering. Switch 410 is described, for example, in ATMS2000 User's Guide, Issue 1.1 (MMC Networks, Inc. of Santa Clara, Calif., January 1996) incorporated herein by reference. See also "ATMS2004B Switch Controller 2 'GRAY'", Issue 1.0, (MMC Networks, Inc. 1995, Document MMC 95-0004 (incorporated herein by reference) and "ATMS2003B Switch Controller 1 'WHITE'" (Issue 1.0, MMC Networks, Inc. 1995, Document MMC 95-0003 (incorporated herein by reference)). Switch 410 is based on the ATMS2000 chip set available from MMC Networks, Inc.

Figure 6:
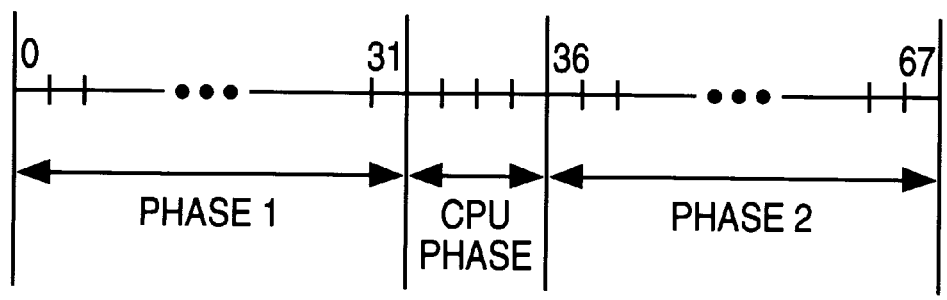
FIG. 6 is a timing diagram for the switch of FIG. 5.

FIG. 6 is a timing diagram of one cycle of switch 410. The switch cycle consists of 68 clock cycles. The first 32 clock cycles, 0–31, form phase 1 of the switch cycle. During each of clock cycles 0–31, switch controller 420 reads LUT 170 for a corresponding one of ports 450. During the next clock cycle, controller 420 reads an ITT entry for the same port, and at the same time, reads a LUT entry for the next port.

During the CPU phase, controller 420 communicates with CPU 460.

During each clock cycle of phase 2, controller 420 reads OPT 240 for a corresponding one of ports 450. During the next clock cycle, controller 420: 1) reads OTT entries 140 for the same port, and 2) reads OPT 240 for the next port. See "ATMS2000 User's Guide", cited above, for more detail.

Figure 7:
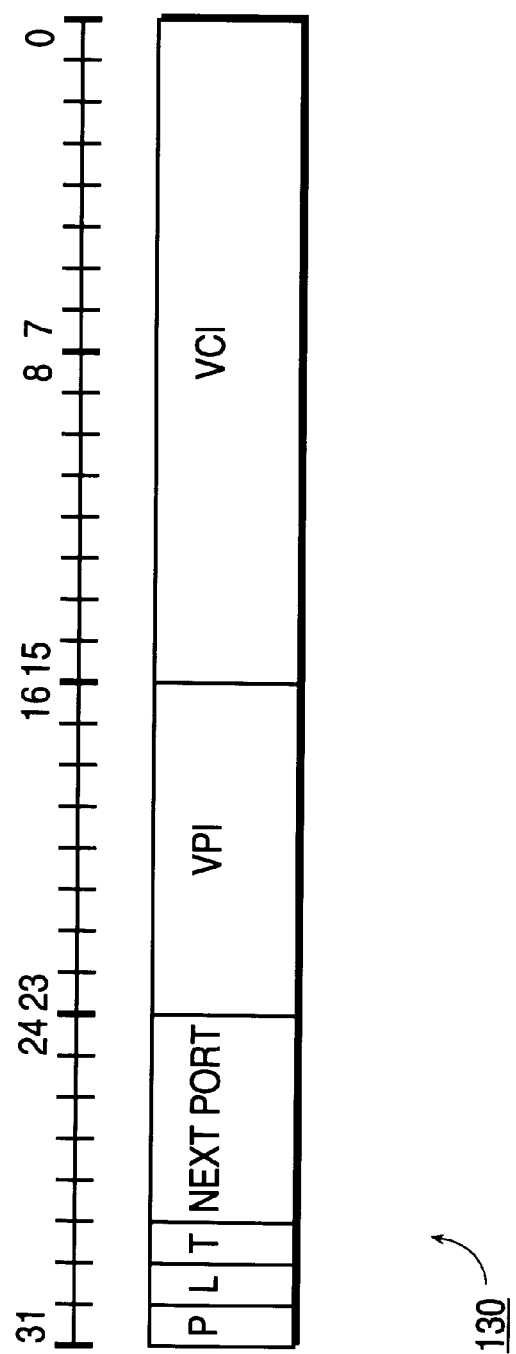
FIG. 7 diagrams a table entry for the system of FIG. 1.
Figure 8:
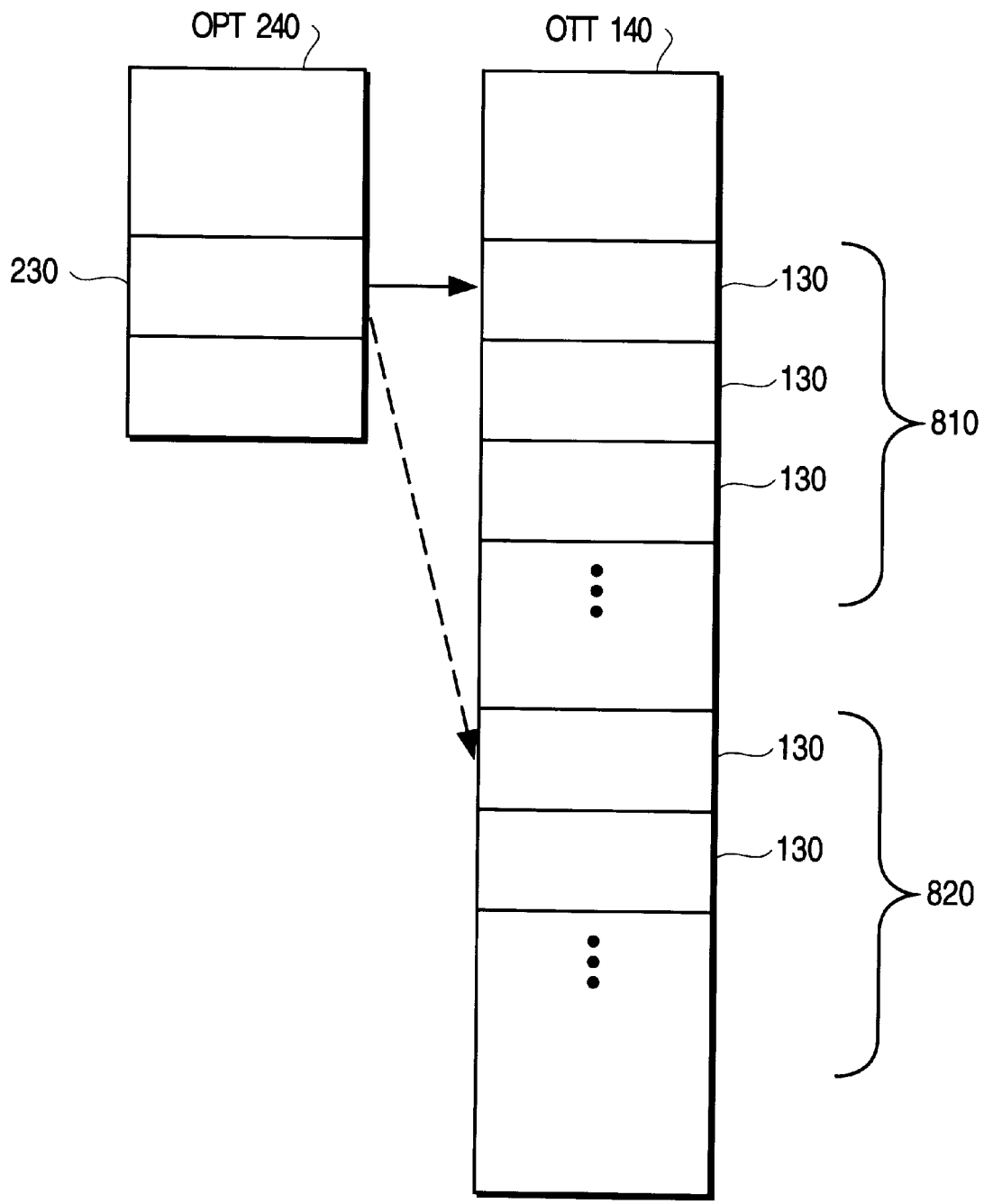
FIG. 8 diagrams two tables of the system of FIG. 1 to illustrate a procedure for changing one of these tables.

FIG. 7 illustrates the format of OTT entry 130. For a point-to-point connection, pointer 230 points to a single entry 130; for a multicast connection, pointer 230 points to a block of entries 130 such as block 810 in FIG. 8. Entries 130 in the block immediately follow one another.

The meaning of the bits in FIG. 7 is as follows.

P, Connection Type, [31]

"0" means VC Connection.

"1" means VP Connection.

This field should match the connection type CT in the corresponding LUT entry 160.

L, Next to Last, [30]

This bit is used to signify that the next entry in the OTT corresponds to the last port in the multicast chain. For a point-to-point connection, L is "don't care."

"0" means the next OTT entry is NOT the last entry.

"1" means the next OTT entry IS the last entry in the chain.

Next Port, [28:24]

This indicates the output port, which is one of ports 450, to be used for the next entry in the multicast chain. The port for the first entry is specified by the Queue field (not shown) of ITT entry 220.

VPI, [23:16]

VPI value to be used when this cells is transmitted.

VCI, [15:0]

VCI value to be used when this cell is transmitted, if this is a VC connection. For a VP connection, the cell is transmitted with VCI=VCIin.

T, Tag Marker, [29]

This bit is explained in the aforementioned "ATMS2004B Switch Controller 2 'GRAY'".

Common Memory 480 (FIG. 5) connected to switch controller 420 stores cell data (48 bytes per cell) and cell attributes. The attributes are described in the aforementioned documents "ATMS2000 User's Guide" (at page 13) and "ATMS2004B Switch Controller 2 'GRAY'" (pages 12–13, under "Attributes Table, ATT"). One of the attributes is the value of OPT pointer 224 (FIG. 1) to OPT entry 230.

Switch 410 may receive a request to expand a block 810 (FIG. 8) of entries 130 corresponding to a given pointer 230, or to reduce the size of block 810, or to change the entries 130 in the block. To avoid race conditions, switch 410 sets up a different block 820 of new OTT entries while OPT entry 230 continues to point to block 810. When block 820 is set up, the address of block 820 is written to pointer 230. Since the cells in common memory 480 are dispatched based on the OPT pointer 224 to entry 230, the cells will be dispatched in accordance with block 820 even if they were written in memory 480 when the pointer 230 pointed to block 810.

The invention is not limited by the embodiments described above. In particular, the invention is not limited by the memory sizes, the number of ports, the length and number of clock cycles, or the length of the VPI, the VCI or any other fields. In some embodiments, the VPI fields are 12 bits long and the VCI fields are 16 bits long. In some embodiments, the implied field 320 is omitted, and the LUT entry stores the entire VCI mask. In some embodiments, the number of bits in the implied field is other than two. Other embodiments and variations are within scope of the invention, as defined by the appended claims.

I claim:

1. A method for routing an ATM cell in an ATM network, the method comprising:

generating a signal S1 incorporating information on an input VCI of the cell, wherein the VCI consists of a first portion of one or more bits and a second portion of zero or more bits; and applying a mask to the signal S1 to inhibit the first portion of the VCI but not the second portion, an using the second portion but not the first portion to determine if the input VCI exceeds a high bound, wherein the mask is stored in a variable size format in a lookup table.

2. The method of claim 1 further comprising:

generating a signal S2 incorporating information on an input VPI of the cell; and using the signal S2 to locate a first entry in said lookup table stored in memory, the first entry including information on the mask.

3. The method of claim 1 wherein applying the mask to the signal S1 comprises:

inverting the mask; and bitwise ANDing the inverted mask with the signal S1.

4. The method of claim 2 wherein:

the first entry also includes information on a memory address A1 which is an address of information on an output header for the cell; and the method further comprises bitwise ORing of at least a portion of the information on the address A1 with the signal S1 to generate the address A1.

5. The method of claim 2 wherein the signal S2 also incorporates information on an input port of the cell.

6. The method of claim 2 wherein the information on the mask in the first entry has a variable length.

7. The method of claim 2 wherein the information on the mask in the first entry comprises a string of zero or more 1's, and the first entry comprises a zero bit marking a start of the string of 1's.

8. The method of claim 7 wherein the mask comprises the string of 1's and a predetermined number of additional 1's.

9. An apparatus for routing ATM cells, the apparatus comprising:

memory for storing information on one or more masks, wherein said one or more masks are stored in a variable size format in a lookup table among said memory; and a circuit C1 for applying a mask to a signal S1 incorporating information on a cell's input VCI so as to inhibit a first portion of the VCI but not a second portion of the VCI, wherein the circuit is to use the second portion of the input VCI but not the first portion of the input VCI to determine if the input VCI exceeds a high bound;

wherein for the VCIs processed by the circuit to determine if the VCI exceeds a high bound:

the first portion of each VCI has zero or more bits, and for at least one VCI the first portion has at least one bit;

the second portion of each VCI has zero or more bits, and for at least one VCI the second portion has at least one bit.

10. The apparatus of claim 9 further comprising a circuit for generating an address A2 to locate information on a mask in the memory, the address A2 being a function of an input VPI of the cell.

11. The apparatus of claim 10 wherein the address A2 is also a function of an input port of the cell.

12. The apparatus of claim 10 wherein the address A2 is to allow to locate information on an address A1 in the memory in addition to the information on the mask, wherein the address A2 is an address of information on an output header of the cell; and the apparatus further comprises a circuit C2 for combining the information on the address A1 in the memory with the signal S1 to generate the address A1.

13. The apparatus of claim 12 wherein:
the circuit C1 comprises:
an inverter for inverting the mask;
a plurality of AND gates for bitwise ANDing of at least a portion of the inverted mask with at least a portion of the signal S1; and
the circuit C2 comprises a plurality of OR gates for bitwise ORing of at least a portion of the information on the address A1 in the memory with at least a portion of the signal S1.

14. The apparatus of claim 12 wherein the information on the mask comprises a string of zero or more 1's, and the memory is to store a zero bit marking a start of the string of 1's.

15. The method of claim 1 further comprising performing error processing if the input VCI exceeds the high bound.

16. The method of claim 15 wherein the error processing comprises discarding the cell whose input VCI exceeds the high bound.

17. The apparatus of claim 9 further comprising an error check circuit for receiving an output of the circuit C1 and checking whether the input VCI exceeds the high bound.

18. The apparatus of claim 9 wherein the apparatus discards the cell whose input VCI exceeds the high bound.

19. An ATM switch circuitry for receiving ATM cells and determining a cell's output VPI and/or output VCI and/or output port number from the cell's input VPI and/or input VCI and/or input port number, the circuitry comprising:

a first memory to be addressed by a first address constructed from at least the input VPI or a combination of the input VPI and the input port number; and a second memory for storing information on at least the output VPI and/or output VCI and/or output port number, the second memory to be addressed by a second address constructed from at least the input VCI and from address data to be read from the first memory, wherein the first memory is to store:
(1) said address data; and
(2) high bound data for determining a high bound for the input VCI,
wherein the high bound data are to be stored in a variable size format in a lookup table among the first memory.

20. The ATM switch circuitry of claim 19 further comprising a circuit for reading the first memory and checking whether the input VCI exceeds the high bound.

21. The ATM switch circuitry of claim 20 wherein the circuitry discards a cell whose input VCI exceeds the high bound.

22. The ATM switch circuitry of claim 19 wherein the high bound data comprise zero or more first bits each of which has a first value, followed by a delimiter bit having a second value, the delimiter bit marking a start of the zero or more first bits, the high bound being defined by the number of the first bits.

23. The ATM switch circuitry of claim 22 wherein the high bound is $2^{n+m}+k$, wherein:
n is the number of the first bits;
m is a predetermined number; and
k is determined by a connection type.

24. The ATM switch circuitry of claim 23 wherein the first memory comprises a plurality of fixed size locations, and for each cell the corresponding address data, high bound data and connection type are to be stored in a single location of the first memory.

25. The ATM switch circuitry of claim 19 wherein the first memory comprises a plurality of fixed size locations, and for each cell the corresponding address data and high bound data are to be stored in a single fixed size location.

26. The ATM switch circuitry of claim 19 further comprising third and fourth memories, wherein the information to be stored in the second memory comprises a pointer to the third memory which is to store a pointer to the fourth memory, the fourth memory to store the cell's output VPI/VCI and output port number for a point-to-point connection, and wherein for a multicast connection, the fourth memory is to store a block of entries immediately following one another, wherein each entry in the block includes an output VPI, an output VCI, and an output port number for the multicast connection.

27. A method for routing an ATM cell in an ATM network, the method comprising:

generating a first address from at least the cell's input VPI or a combination of the cell's input VPI and the cell's input port number, and using the first address to read from a first memory:
(1) address data to be used to generate a second address, and
(2) high bound data for defining a high bound for the cell's input VCI, wherein the high bound data has a variable size format and is stored in a in a lookup table among said first memory;

generating the second address from at least said address data and the cell's input VCI, and applying the second address to a second memory to read from the second memory information on the cell's output VPI and/or output VCI and/or output port number; and checking whether the input VCI exceeds the high bound, and performing error processing if the input VCI exceeds the high bound.

28. The method of claim 27 wherein the error processing comprises discarding the cell if the input VCI exceeds the high bound.

29. The method of claim 27 wherein the high bound data comprise zero or more first bits each of which has a first value, followed by a delimiter bit having a second value, the delimiter bit marking a start of the zero or more first bits, the high bound being defined by the number of the first bits.

30. The method of claim 1 wherein the second portion has one or more bits.

31. The method of claim 1 wherein the second portion consists of one or more most significant bits of the VCI, and the first portion consists of one or more least significant bits of the VCI.

32. The method of claim 1 applied to route a plurality of cells including at least a first cell and a second cell, wherein the first portions of the first and second cells are different in size, and the second portions of the first and second cells are different in size.

33. The method of claim 1 applied to route a plurality of cells, wherein:

determining if an input VCI of a cell exceeds a high bound comprises determining if the input VCI exceeds one of a plurality of high bounds, wherein each high bound is defined by a mask, and each mask is defined by information stored in a memory; and for any two high bounds HB1 and HB2 such that HB1 is less than HB2, the information defining the mask for the bound HB1 takes less memory than the information defining the mask for the bound HB2.

34. The method of claim 6 wherein the first entry has a predetermined fixed size, and the first entry also includes information on an output header of the cell.

35. The apparatus of claim 9 wherein the information on the masks has a variable size format, allowing the information on different masks to be stored in memory fields of different sizes.

36. The apparatus of claim 9 wherein the apparatus is operable to apply different high bounds such that, for any two high bounds HB1 and HB2 such that HB1 is less than HB2, the size of a mask applied to determine if a VCI exceeds HB1 is less than the size of a mask applied to determine if a VCI exceeds HB2.

37. The ATM switch circuitry of claim 19 wherein for any two high bounds HB1 and HB2 such that HB1 is less than HB2, the high bound data determining the high bound HB1 takes less memory than the high bound data determining the high bound HB2.

38. The method of claim 27 wherein for any two high bounds HB1 and HB2 such that HB1 is less than HB2, the high bound data determining the high bound HB1 takes less memory than the high bound data determining the high bound HB2.

39. A network apparatus comprising:
one or more ports for receiving data from a network, wherein the data comprise address information, wherein at least a portion of the address information is to be limited by a bound;
a memory for storing information defining bounds, wherein said information is stored in a variable size format in a lookup table among said memory allowing the information for different bounds to be stored in memory fields of different sizes; and
a circuit for checking if said at least a portion of the address information is limited by a respective bound defined by said information.

40. The apparatus of claim 39 wherein said network is a connection oriented network and the address information identifies a connection on which the data are received.

41. The apparatus of claim 39 wherein said network is an ATM network, a separate bound is defined for data which have a given VPI and/or are received on a given port of the apparatus, and said at least a portion of the address information comprises an input VCI.

42. The apparatus of claim 39 wherein, for any high bound HB, the information defining the high bound HB comprises at most $\log_2(HB+1)-1$ bits.

43. The apparatus of claim 39 wherein each of said memory fields is part of a fixed size entry which also has another field containing information on an output header for the respective data.

44. The apparatus of claim 39 wherein each bound is a high bound.

45. A method for processing data in a network, the method comprising:
storing, in a memory, information defining bounds for at least portions of address information which is included in data carried by the network, wherein said information is stored in a variable size format in a lookup table among said memory allowing the information for different bounds to be stored in memory fields of different sizes;
receiving data from the network, wherein the data comprise said address information; and
checking if at least a portion of the address information is limited by a respective bound defined by the information stored in the memory.

46. The method of claim 45 wherein the network is an ATM network, a separate bound is defined for data which have a given VPI and/or are received on a given port from the network, and each of said at least portions of the address information comprises an input VCI.

47. The method of claim 45 wherein, for any high bound HB, the information defining the high bound HB comprises at most $\log_2(HB+1)-1$ bits.

48. The method of claim 45 wherein each of said memory fields is part of a fixed size entry which also has another field containing information on an output header for the respective data.

49. A network apparatus comprising:
a first circuit for receiving data from a network;
a memory for storing information used in determining how the received data are to be processed; and
a second circuit for generating a pointer to the memory to access said information, wherein:
the received data comprise a first portion and a second portion;
the pointer comprises a first field determined from the first portion of the received data, and a second field determined from the second portion of the received data; and
each of the first and second fields has a variable size.

50. The network apparatus of claim 49 wherein the information includes information on an output header for the data.

51. The network apparatus of claim 49 wherein the apparatus comprises an ATM switch, the first portion includes an input VPI, and the second portion includes an input VCI.

52. The network apparatus of claim 51 wherein a number of bits in each of the first and second fields is determined using the input VPI but not the input VCI.

53. The network apparatus of claim 49 further comprising a memory for storing information on the sizes of the first and second fields, wherein the second circuit is to read the information on the sizes to generate said pointer.

54. A method for processing network data, the method comprising:
receiving the data from a network;
storing, in a memory, information on how the received data are to be processed; and
generating a pointer to the memory to access said information, wherein:
the received data comprise a first portion and a second portion;
the pointer comprises a first field determined from the first portion of the received data, and a second field determined from the second portion of the received data; and
each of the first and second fields has a variable size.

55. The method of claim 54 wherein:
the network is an ATM network, the first portion includes an input VPI, and the second portion includes an input VCI;
the information includes information on an output header for the data; and
a number of bits in each of the first and second fields is determined using the input VPI but not the input VCI.

* * * * *